(12) United States Patent
Khafagy et al.

(10) Patent No.: US 9,783,187 B2
(45) Date of Patent: Oct. 10, 2017

(54) MITIGATING TRANSIENT CURRENT EFFECTS IN ENGINE AUTOSTART/STOP VEHICLE

(71) Applicant: FORD GLOBAL TECHNOLOGIES, LLC, Dearborn, MI (US)

(72) Inventors: Hafiz Shafeek Khafagy, Dearborn, MI (US); David Celinske, Wolverine Lake, MI (US); Hanyang B. Chen, Canton, MI (US); Mohannad Hakeem, Dearborn, MI (US); Rashad Jamal Allen, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 15/000,634

(22) Filed: Jan. 19, 2016

(65) Prior Publication Data

US 2017/0203752 A1 Jul. 20, 2017

(51) Int. Cl.
*B60W 20/13* (2016.01)
*F02D 41/06* (2006.01)
*F02N 11/08* (2006.01)

(52) U.S. Cl.
CPC .......... *B60W 20/13* (2016.01); *F02D 41/065* (2013.01); *F02N 11/08* (2013.01); *F02N 2200/062* (2013.01)

(58) Field of Classification Search
CPC ...... B60W 20/13; F02D 41/065; F02N 11/08; F02N 2200/062
See application file for complete search history.

(56) References Cited

U.S. PATENT DOCUMENTS

| 6,242,873 B1 | 6/2001 | Drozdz et al. |
| 2013/0018569 A1 | 1/2013 | Sangameswaran et al. |
| 2014/0235406 A1* | 8/2014 | Sangameswaran ... B60W 10/06 477/99 |
| 2014/0236459 A1* | 8/2014 | Boesch .................. F02D 29/02 701/112 |
| 2015/0019079 A1* | 1/2015 | Romanato ........... F02N 11/0822 701/41 |

FOREIGN PATENT DOCUMENTS

WO 2014031099 A1 2/2014

* cited by examiner

*Primary Examiner* — Russell Frejd
(74) *Attorney, Agent, or Firm* — David Kelley; Brooks Kushman P.C.

(57) ABSTRACT

A vehicle includes an engine and a controller programmed to autostart and autostop the engine. In an autostopped state, engine autostarts are inhibited in the presence of transient currents caused by activation of electrical loads. Engine autostarts are inhibited for a predetermined duration after activation of the electrical load when a battery current is greater than an autostart current threshold.

16 Claims, 3 Drawing Sheets

MITIGATING TRANSIENT CURRENT EFFECTS IN ENGINE AUTOSTART/STOP VEHICLE

TECHNICAL FIELD

This application generally relates to controlling engine autostart/autostop in vehicles.

BACKGROUND

A micro-hybrid vehicle may automatically stop its internal combustion engine for a period of time when particular conditions are met. Automatic engine stops may improve fuel economy by reducing the amount of time the engine is idling while the vehicle is at standstill or coasting to a stop.

SUMMARY

In some configurations, a vehicle includes a controller programmed to, in response to electrical load activation, inhibit engine autostart up to expiration of a predetermined duration so long as a difference between a postactivation battery current, that exceeds a predetermined autostart threshold for a portion of the duration, and a preactivation battery current is less than a predetermined difference, and in response to the postactivation battery current exceeding the predetermined autostart threshold after the duration, request engine autostart.

Some configurations may include one or more of the following features. The vehicle in which the preactivation battery current is less than the predetermined autostart threshold. The vehicle in which the predetermined duration is longer than an expected duration of a peak current caused by the electrical load activation. The vehicle in which the predetermined difference is based on a maximum expected inrush current of the postactivation battery current. The vehicle in which the preactivation battery current is a time averaged current during a predetermined time period prior to the electrical load activation. The vehicle in which the controller is further programmed to, in response to the difference exceeding the predetermined difference during the duration, request engine autostart.

In some configurations, a vehicle includes an engine. The vehicle also includes an electrical load. The vehicle also includes a controller programmed to request an engine autostart when a battery current exceeds a predetermined current and, in response to the battery current exceeding the predetermined current within a predetermined duration that begins with detection of a transition of the electrical load to an activated state, inhibit autostart of the engine up to expiration of the predetermined duration so long as a difference between a magnitude of the battery current before and after the detection is less than a predetermined difference.

Some configurations may include one or more of the following features. The vehicle in which the predetermined duration is longer than an expected duration of a peak current caused by the transition. The vehicle in which the controller is further programmed to, in response to the difference exceeding the predetermined difference during the predetermined duration, request an autostart of the engine. The vehicle in which the predetermined duration is a period of time in which an inrush current caused by electrical load activation is expected to decay to a steady-state current. The vehicle in which the magnitude of the battery current before the detection is a time averaged battery current over a predetermined time period prior to the transition. The vehicle in which the magnitude of the battery current before the detection is less than the predetermined current.

In some configurations, a controller-based method includes, in response to electrical load activation, inhibiting engine autostart up to expiration of a predetermined duration so long as a difference between a postactivation battery current, that exceeds a predetermined threshold for a portion of the duration, and a preactivation battery current is less than a predetermined difference. The method further includes, in response to the postactivation battery current exceeding the predetermined threshold after expiration of the duration, requesting engine autostart.

Some configurations may include one or more of the following features. The method may include requesting, by the controller, engine autostart in response to the difference exceeding the predetermined difference during the duration. The method in which the predetermined duration is a period of time in which an inrush current after electrical load activation is expected to decay to a steady-state current. The method may include averaging, by the controller, a battery current over a predetermined time period prior to electrical load activation to generate the preactivation battery current.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
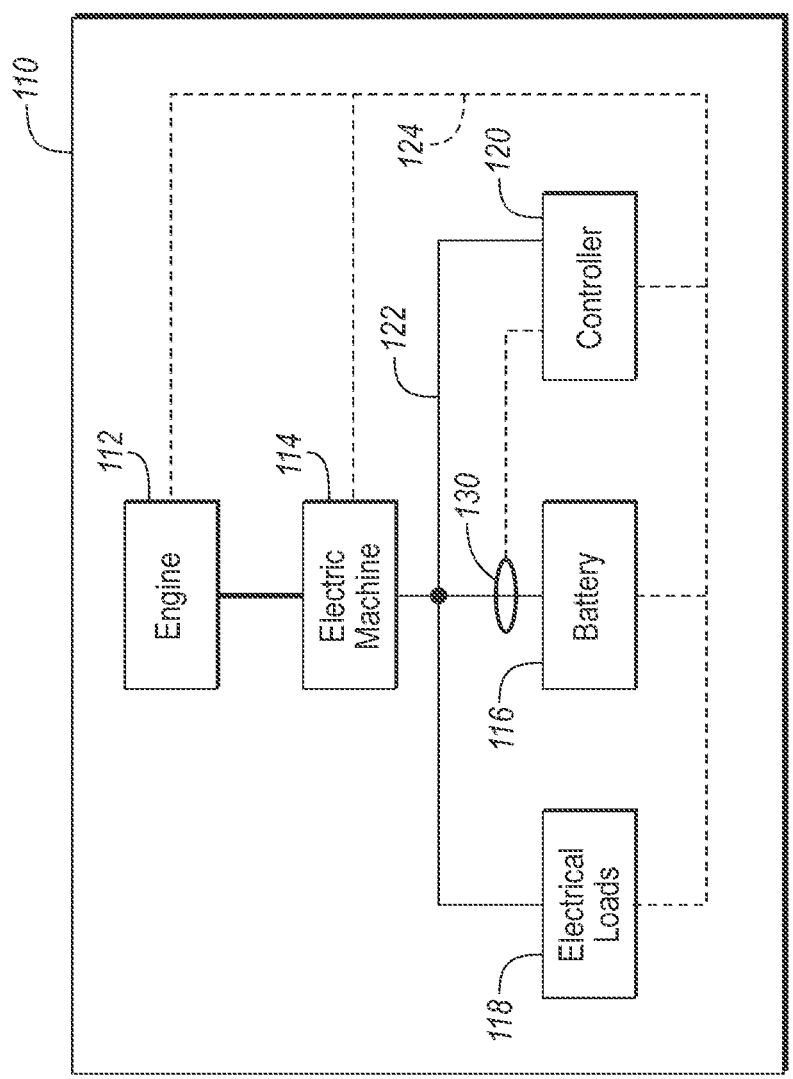
FIG. 1 is a block diagram for a micro-hybrid vehicle.

Referring to FIG. 1, a micro-hybrid vehicle 110 may include an engine 112, an electric machine 114 that may be referred to as an alternator or integrated starter generator, a battery 116 (e.g., a 12 V battery), electrical loads 118 (e.g., pumps of a climate control system, a power steering assist system, etc.) in communication with/under the control of one or more controllers 120 (as indicated by dashed line). The engine 112 is mechanically connected with the electric machine 114 (as indicated by heavy line) such that the engine 112 may drive the electric machine 114 to generate electric current. The electric machine 114 and battery 116 are electrically connected with each other and the electrical loads 118 (as indicated by thin line) via a power network 122. The power network 122 may be a series of conductors electrically interconnecting the components. The power network 122 may include power and ground signals. Hence, the electric machine 114 may charge the battery 116; the electrical loads 118 may consume electric current provided by the electric machine 114 and/or battery 116.

The controllers 120 may initiate an autostop or autostart of the engine 112. As the vehicle 110 comes to a stop, for example, the controllers 120 may issue a command to begin the process to stop the engine 112, thus preventing the electric machine 114 from providing electric current to the electrical loads 118. The battery 116 may provide electric current to the electrical loads 118 while the engine 112 is stopped. As a brake pedal (not shown) is disengaged (and/or an accelerator pedal (not shown) is engaged) after an engine autostop, the controllers 120 may issue a command to begin the process to start the engine 112, thus enabling the electric machine 114 to provide electric current to the electrical loads 118.

The controller 120 may monitor conditions for starting and stopping of the engine 112 during an ignition cycle. Conditions may include determining when to autostop the engine 112 to improve fuel economy. For example, during a brake application the engine 112 may be autostopped. Other conditions may include determining when to autostart the engine 112. For example, when an operator releases the brake pedal, the engine 112 may be autostarted. The controllers 120 may be coupled to the battery 116, the electrical loads 118, the electric machine 114, and the engine 112 via a control network 124. The control network 124 may include discrete hardware connections between modules. The control network 124 may include a communications network in which the modules may communicate serially. In some configurations, the controller 120 may coordinate the operation of multiple controllers to perform autostop and autostart of the engine 112. For example, an engine controller may communicate with the controller 120 via the communications network (e.g., Controller Area Network (CAN)).

Figure 2:
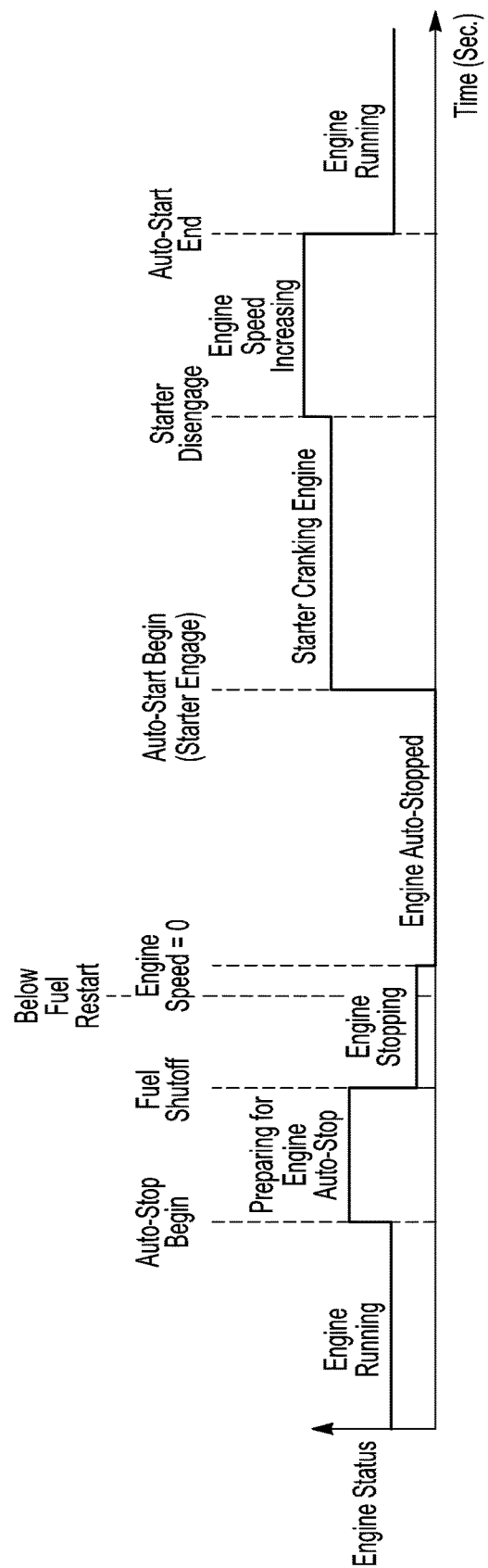
FIG. 2 is a plot of engine status versus time before, during and after an engine stop/start event.

Referring to FIG. 2, an engine autostop event may include several stages: "autostop begin," which marks the beginning of the engine autostop event; "preparing for engine autostop," which is the time period during which vehicle systems as well as the engine are prepared for the impending engine stop (if an autostop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed reduces to 0; "below fuel restart," which marks the point after which if a restart is requested during the "engine stopping" stage, the starter may need to be engaged to crank the engine (if a restart is requested before "below fuel restart" and during the "engine stopping" stage, the engine may be restarted by turning the flow of fuel back on); "engine speed=0," which marks the point at which the engine speed is near or equal to 0; "engine autostopped," which is the time period during which the engine is off; "starter engage," which marks the point at which the starter starts to crank the engine in an effort to start the engine (in response to detecting an engine autostart condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed (a speed at or above target idle speed); and, "autostart end," which marks the point at which the speed of the engine achieves its running speed.

Referring again to FIG. 1, the electrical loads 118 may be operative while the engine 112 is off during an engine stop/start event. For example, pumps associated with a climate control system may be on during this time period. Hence, the battery 116 may need to provide current to support these loads. The current demands of the electrical loads 118 during an engine stop/start event, however, may exceed the recommended capabilities of the battery 116. That is, voltage of the battery 116 may fall below a recommended limit while supporting the electrical loads 118 during an engine stop/start event. To prevent this situation from occurring, the controllers 120 may determine the current demands of the electrical loads 118 and compare them with a predetermined threshold. For example, values of current provided by the electric machine 114 and battery 116 may be summed to determine the total current demand of the electrical loads 118. If the total current demand exceeds the predetermined threshold, the controllers 120 may inhibit any attempt to autostop the engine 112. The predetermined threshold may be determined by testing, simulation, etc. and selected so as to preclude the voltage of the battery 116 from falling below a desired level.

The current demands of certain of the electrical loads 118 may depend on whether the engine 112 is on or off. For example, the current demands of an engine cooling fan or fuel pump may decrease to 0 while the engine 112 is off during an engine stop/start event Likewise, the current demands of pumps associated with a climate control system may decrease while the engine 112 is off during an engine stop/start event. Current demands of other subsystems, however, may increase while the engine 112 is off during an engine stop/start event. Hence, the net value of the current demands of the electrical loads 118 may either decrease or increase once the engine 112 has been auto stopped.

The controller 120 may be programmed to implement a variety of strategies for autostarting and autostopping the engine 112. For example, the engine 112 may be autostopped during braking events or when the vehicle 110 is in a park mode. Conditions for autostarting the engine 112 may include the current drawn from the battery exceeding an autostart current threshold. Conditions for autostopping the engine 112 may include the current drawn from the battery being less than an autostop current threshold. The autostop current threshold and the autostart current threshold may be different to avoid rapid on/off cycling of the engine 112. Such a strategy may handle steady-state currents effectively, but may fail to handle transient current conditions effectively. For example, the strategy may autostart the engine 112 in response to transient current conditions that exceed the autostart current threshold. As the transient currents may decay quickly, there may have been no need to autostart the engine 112. The result is a system that may include short engine cycles caused by transient current conditions.

One strategy to avoid these unnecessary stop-start cycles may be to incorporate a waiting time for autostarting the engine 112. The controllers 120 may be programmed to autostart the engine 112 in response to the battery current being greater than the autostart current threshold for a duration greater than or equal to the waiting time. This strategy may cause engine autostart cycles to be delayed when steady-state current demands exceed the autostart current threshold.

The vehicle 110 may include a current sensor 130 that is configured to measure the current flowing to and from the battery 116. The current sensor 130 may provide a signal to the controller 120 that is indicative of the battery current magnitude and direction. The controller 120 may include circuitry to filter the signal and convert the signal to digital form for processing.

The electrical load 118 may be coupled to the controller 120 by a control signal or via the control network 124. The controller 120 may be programmed to control operation of the electrical load 118. Controlling the electrical load 118 may include activating and deactivating the electrical load 118. The electrical load 118, when in an activated state, may draw current from the power network 122. A magnitude of the current may depend upon the amount of time after activation. For a period of time immediately following activation, the current may be in a transient phase. The transient phase includes an inrush current that may be a transient current that is greater than a steady-state rated current value. Many electrical loads have an inrush current. For example, electric motors and transformers, light bulbs, and power converters may exhibit a high inrush current.

After the transient phase, the current drawn by the electrical load 118 may be in a steady-state phase. In the steady-state phase, the current level may be at the steady-state rated current value. The steady-state rated current value may be the current value that is measured when the electrical load 118 remains activated after the transient phase.

The controller 120 may be programmed to request autostart and autostop of the engine 112 based on the battery current. In some configurations, an autostart cycle may be requested in response to the battery current being greater than a predetermined current threshold. In some configurations, the autostart cycle may be requested in response to the battery current being greater than the predetermined current threshold for a duration greater than a predetermined duration. Adding the duration condition may help to prevent unnecessary autostart cycles but may delay some autostart cycles.

The electrical load 118, when transitioning from a deactivated state to an activated state, may draw an inrush current that is greater than the predetermined rated current from the power network 122. The inrush current may have a known duration. Different electrical loads 118 may have a different inrush duration.

Upon activation of the electrical load 118, the current draw by the electrical load 118 may be greater than the predetermined rated current for a period of time. The current may decay over the period of time toward the predetermined rated current of the electrical load 118. The short-term effects of activating the electrical load 118 may be different than the steady-state effects of activating the electrical load 118. Due to the transient inrush current, the battery current may reach a higher peak immediately following activation than during the steady-state condition.

The impact of the transient component of the load current may be to cause the battery current to exceed the autostart current threshold. When the transient component decays, the battery current may then fall below the autostart current threshold. The impact on the vehicle may be that the engine 112 is started for a brief period of time. This start/stop cycle may be unnecessary as the battery 116 may be capable of handling the short-term transient condition.

To prevent these unnecessary engine start/stop cycles, it may be beneficial to identify when transient currents may be present. The controller 120 may be programmed to monitor an activation status of the electrical loads 118 to determine when the electrical loads 118 transition from a deactivated state to an activated state. When a transition from a deactivated state to an activated state is detected, the controller 120 may modify the autostart transition criteria to prevent the transient current from causing an autostart cycle.

The activation status of the electrical load 118 may be communicated via the control network 124 to the controller 120. For example, a signal in a serial data message may indicate the on/off status of the electrical load. The controller 120 may receive a signal indicative of an activation state of the electrical load 118. A transition in value of this signal may indicate when the electrical load 118 has changed activation status. To detect a transition from a deactivated state to an activated state, the controller 120 may monitor this signal for the appropriate change in value.

To improve reliability of engine autostart/stop cycling, the controller 120 may be programmed to detect transient current conditions when electrical loads 118 are activated. Knowing that a change in the battery current is due to transient currents during activation may allow the autostart to be inhibited. The controller 120 may be programmed to detect a magnitude of the transient current condition. The magnitude of the transient current may be detected based on a difference between a preactivation battery current measured prior to detecting activation of the electrical load 118 and a postactivation battery current measured after detecting activation of the electrical load 118.

The preactivation battery current may be a current that is measured prior receiving or detecting any signals indicative of a transition of the electrical loads 118 to an activated state. The preactivation battery current may represent a previous steady-state current value. The preactivation battery current may be a low-pass filtered current during some time period prior to detecting the activation. The preactivation battery current may be a time-averaged value over some interval before detecting the activation.

The postactivation current may be a current measurement that is sampled after detecting the activation. The postactivation current may be an instantaneous current value and represents the transient current. The difference between the postactivation battery current and the preactivation battery current provides an indication of the transient current magnitude. The difference may be computed for a number of time periods after activation to monitor transient current. Under normal conditions, the transient current magnitude may be expected to increase rapidly after activation and decay for a period of time after activation to a steady-state value.

In some configurations, upon detecting an activation of an electrical load 118 that is known to have a significant transient current, engine autostarts may be inhibited for a predetermined duration when the transient current magnitude is less than a predetermined magnitude. This may prevent the engine 112 from autostarting due to a short-term transient condition. The preactivation current may be less than the predetermined autostart current threshold. The postactivation battery current may be greater than the predetermined autostart current threshold. In this case, engine autostarts may be inhibited to prevent starting due to the transient condition. The predetermined duration for inhibiting the engine autostarts may be based on an expected duration of the transient current condition. For example, testing may show that a transient current decays within ten seconds after activation of the load. After the predetermined duration, if the postactivation battery current is greater than the predetermined autostart current threshold, an engine autostart may be requested.

In some configurations, an engine autostart may be requested when the transient current magnitude is greater than the predetermined magnitude. For example, an inrush current may be much larger in magnitude than expected. The predetermined magnitude may be based on a maximum expected inrush current magnitude for the electrical load 118. In such conditions, the engine autostart may be requested.

In some configurations, engine autostarts may be inhibited in response to the battery current exceeding the predetermined autostart current threshold within a predetermined duration immediately following detection of a transition of the electrical load 118 to an activated state. If the battery current exceeds the predetermined autostart current threshold for a time longer than the predetermined duration, an engine autostart may be requested. Further, if the transient current magnitude is greater than a threshold during the predetermined duration, an engine autostart may be requested.

Figure 3:
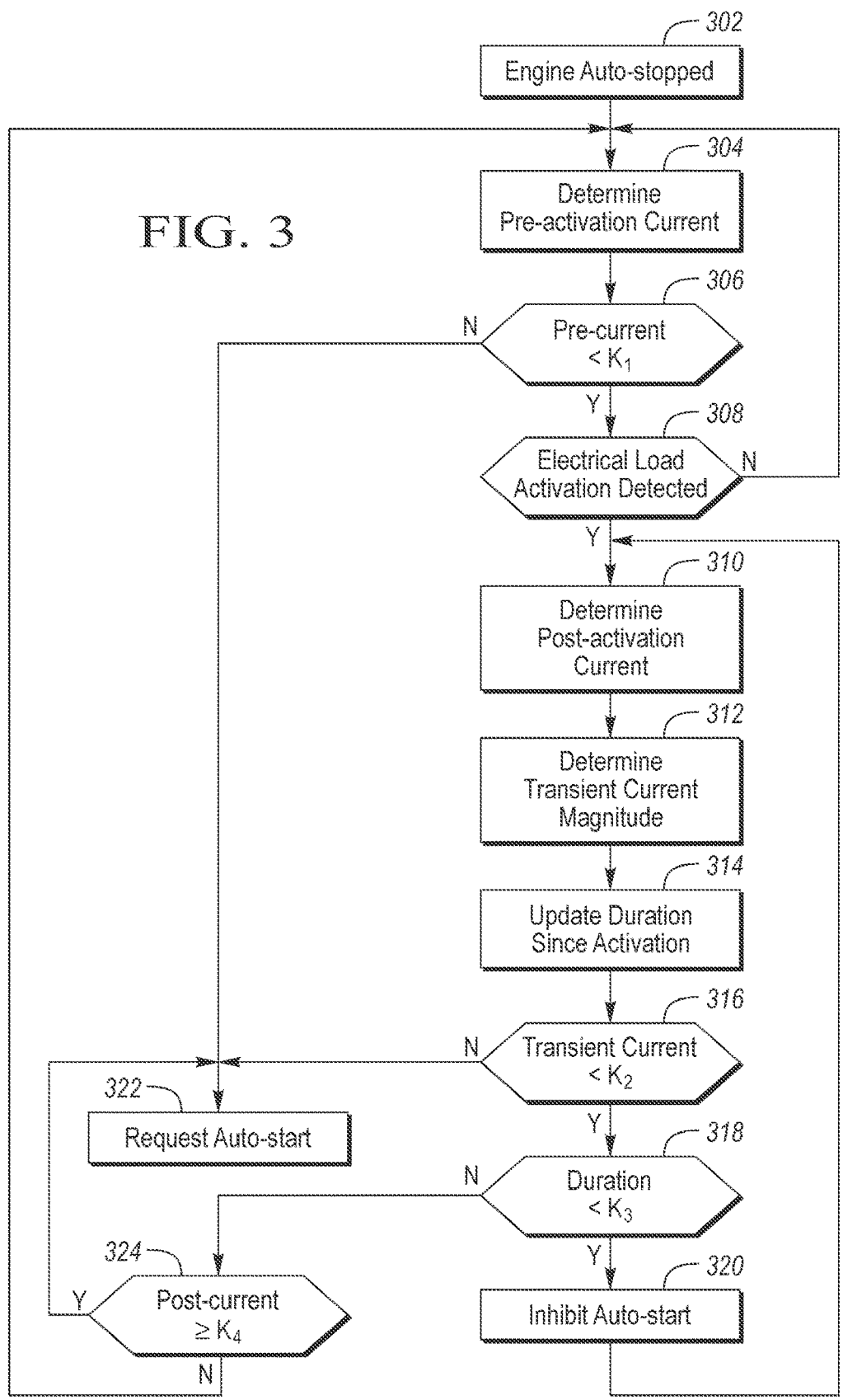
FIG. 3 is a possible flowchart for a sequence of operations for managing engine autostarts.

FIG. 3 depicts a possible flowchart for a sequence of operations for managing the described autostart logic. At operation 302, the engine 112 may be autostopped. That is, conditions at some prior time were such that an engine autostop was initiated. At operation 304, the preactivation battery current is measured or otherwise estimated. At operation 306, the preactivation battery current is compared to the predetermined autostart current threshold. If the preactivation current is greater than or equal to the threshold, then operation 322 may be executed to request an autostart. In some configuration, the preactivation current must be greater than the threshold for a predetermined time before executing operation 322.

If the preactivation current is less than the threshold, then operation 308 is executed to determine if the electrical load 118 has transitioned to an activated state. If no activations are detected, execution may return to operation 304. If activation is detected, operation 310 may be executed to determine the postactivation battery current. Operation 312 may be executed to determine the transient current magnitude. Operation 314 may be executed to update the duration since the activation. This may be implemented as a counter that may be reset upon entering the autostopped state.

Operation 316 may be executed to compare the transient current magnitude to the maximum expected transient current threshold. If the transient current magnitude is greater than or equal to the threshold, operation 322 may be executed to request an engine autostart. If the transient current magnitude is less than the threshold, operation 318 may be executed to compare the duration after activation to a predetermined duration threshold. If the duration is less than the threshold, then operation 320 may be executed to inhibit engine autostarts. After inhibiting autostarts, execution may return to operation 310 to check the postactivation current and monitor the duration after activation.

If the duration is greater than or equal to the threshold, then operation 324 may be executed to compare postactivation current to the predetermined autostart threshold. If the postactivation current is greater than or equal to the threshold, then operation 322 may be executed to request an engine autostart. If the postactivation current is less than the threshold, then execution may return to operation 304.

The system maximizes the time spent with the engine autostopped and eliminates nuisance autostart/stop cycles that impact customer satisfaction. Further, fuel economy and battery energy are conserved by eliminating nuisance autostart cycles.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to, in response to electrical load activation, inhibit engine autostart up to expiration of a predetermined duration so long as a difference between a postactivation battery current, that exceeds a predetermined autostart threshold for a portion of the duration, and a preactivation battery current is less than a predetermined difference, and in response to the postactivation battery current exceeding the predetermined autostart threshold after the duration, request engine autostart.

2. The vehicle of claim 1 wherein the preactivation battery current is less than the predetermined autostart threshold.

3. The vehicle of claim 1 wherein the predetermined duration is longer than an expected duration of a peak current caused by the electrical load activation.

4. The vehicle of claim 1 wherein the predetermined difference is based on a maximum expected inrush current of the postactivation battery current.

5. The vehicle of claim 1 wherein the preactivation battery current is a time averaged current during a predetermined time period prior to the electrical load activation.

6. The vehicle of claim 1 wherein the controller is further programmed to, in response to the difference exceeding the predetermined difference during the duration, request engine autostart.

7. A vehicle comprising:
an engine;
an electrical load; and
a controller programmed to request an engine autostart when a battery current exceeds a predetermined current and, in response to the battery current exceeding the predetermined current within a predetermined duration that begins with detection of a transition of the electrical load to an activated state, inhibit autostart of the engine up to expiration of the predetermined duration so long as a difference between a magnitude of the battery current before and after the detection is less than a predetermined difference.

8. The vehicle of claim 7 wherein the predetermined duration is longer than an expected duration of a peak current caused by the transition.

9. The vehicle of claim 7 wherein the controller is further programmed to, in response to the difference exceeding the predetermined difference during the predetermined duration, request an autostart of the engine.

10. The vehicle of claim 7 wherein the predetermined duration is a period of time in which an inrush current caused by electrical load activation is expected to decay to a steady-state current.

11. The vehicle of claim 7 wherein the magnitude of the battery current before the detection is a time averaged battery current over a predetermined time period prior to the transition.

12. The vehicle of claim 7 wherein the magnitude of the battery current before the detection is less than the predetermined current.

13. A method comprising:
by a controller,
in response to electrical load activation, inhibiting engine autostart up to expiration of a predetermined duration so long as a difference between a postactivation battery current, that exceeds a predetermined threshold for a portion of the duration, and a preactivation battery current is less than a predetermined difference; and
in response to the postactivation battery current exceeding the predetermined threshold after expiration of the duration, requesting engine autostart.

14. The method of claim 13 further comprising requesting, by the controller, engine autostart in response to the difference exceeding the predetermined difference during the duration.

15. The method of claim 13 wherein the predetermined duration is a period of time in which an inrush current after electrical load activation is expected to decay to a steady-state current.

16. The method of claim 13 further comprising averaging, by the controller, a battery current over a predetermined time period prior to electrical load activation to generate the preactivation battery current.

* * * * *